July 25, 1961   J. M. BENDOT   2,993,623
ARTICLE HANDLING APPARATUS
Original Filed Feb. 14, 1952   4 Sheets-Sheet 1
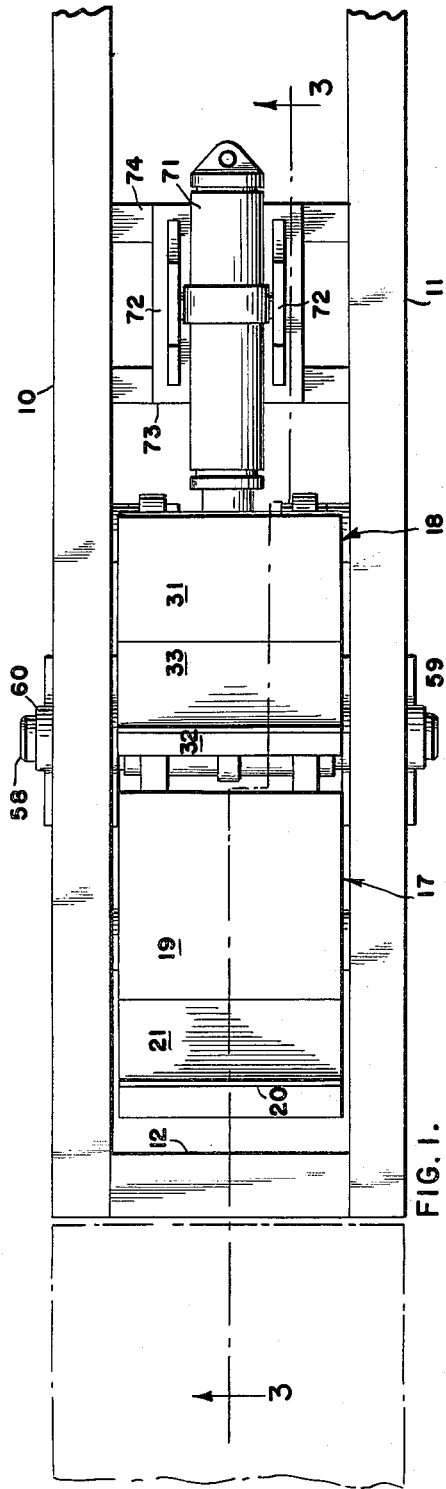
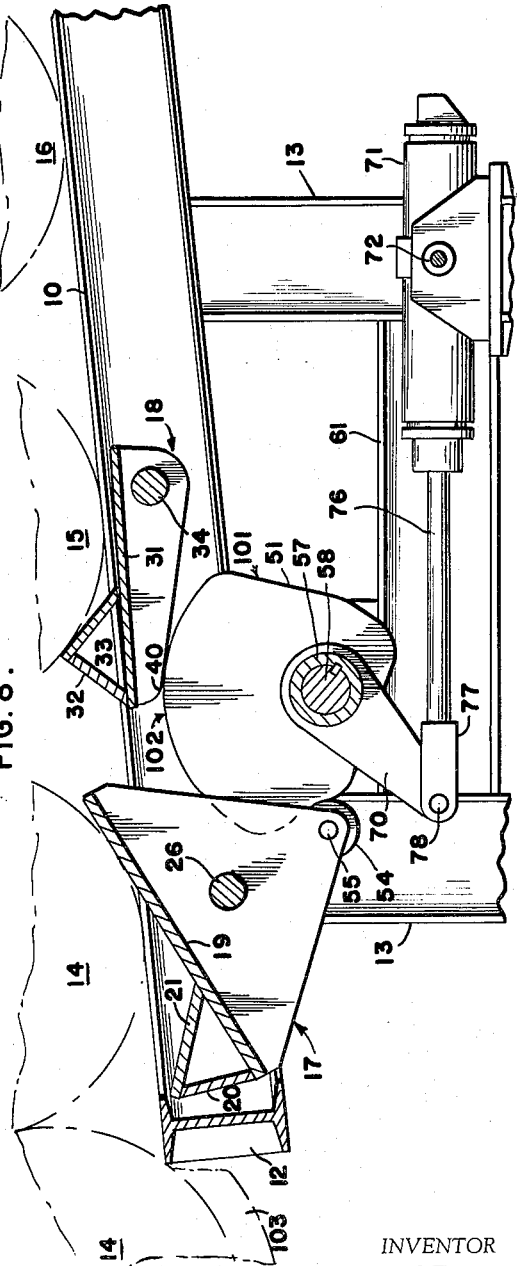
INVENTOR
JOSEPH M. BENDOT
BY
ATTORNEY July 25, 1961 J. M. BENDOT 2,993,623
ARTICLE HANDLING APPARATUS
Original Filed Feb. 14, 1952 4 Sheets-Sheet 2

INVENTOR
JOSEPH M. BENDOT
BY
ATTORNEY

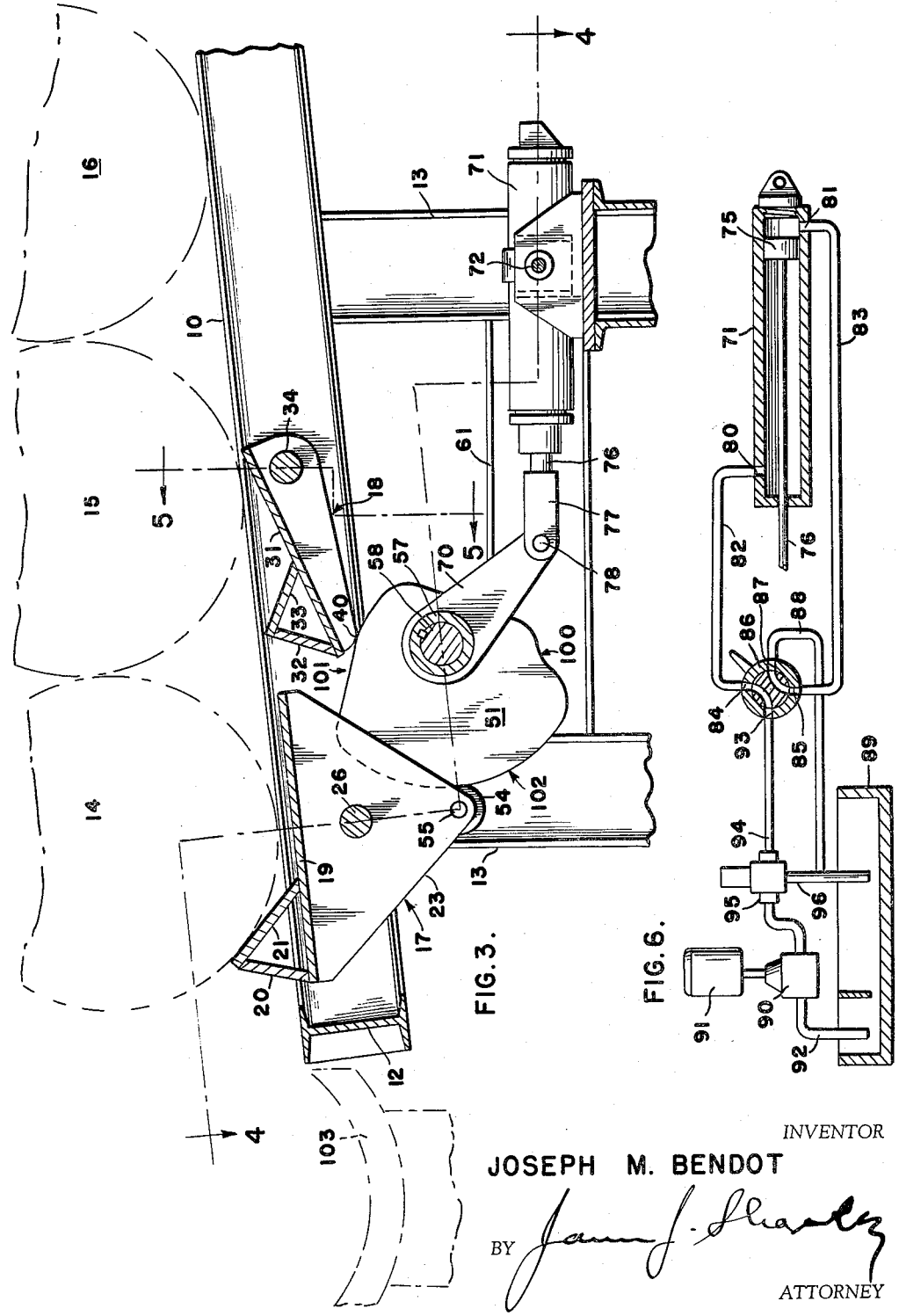

July 25, 1961 J. M. BENDOT 2,993,623
ARTICLE HANDLING APPARATUS
Original Filed Feb. 14, 1952 4 Sheets-Sheet 4
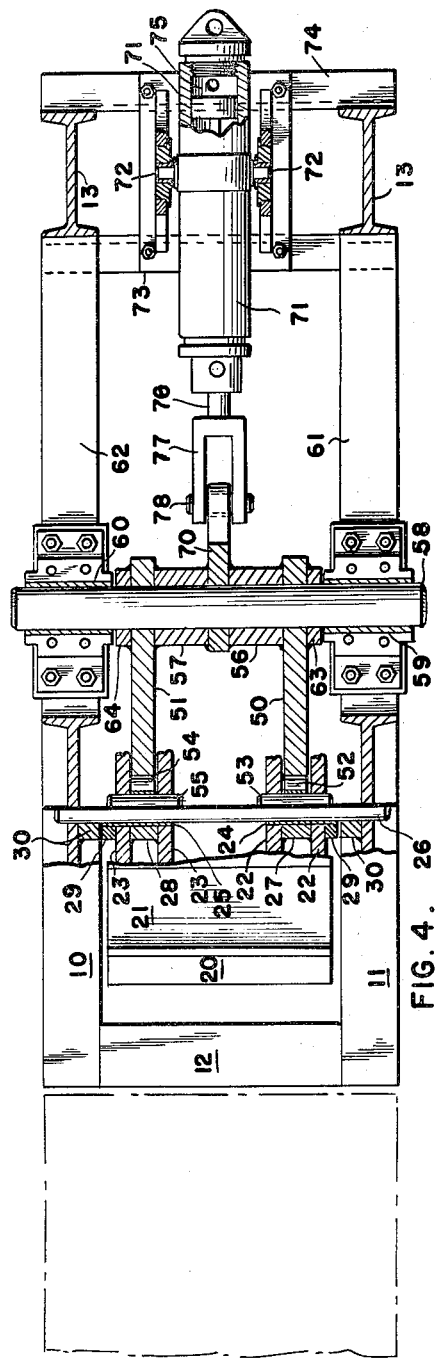
INVENTOR
JOSEPH M. BENDOT
BY
ATTORNEY United States Patent Office 2,993,623
Patented July 25, 1961

2,993,623
ARTICLE HANDLING APPARATUS
Joseph M. Bendot, Steubenville, Ohio, assignor to National Steel Corporation, a corporation of Delaware
Continuation of application Ser. No. 271,523, Feb. 14, 1952. This application Feb. 27, 1959, Ser. No. 797,821
3 Claims. (Cl. 221—298)

This invention relates to article handling apparatus and more particularly to a stop and release device for controllably delivering a predetermined number of a series of articles, especially large articles of great mass.

Article handling devices provided by the prior art are either of light construction incapable of carrying articles of great mass or they do not include apparatus for positively controllably delivering the articles with absolute safety.

It is therefore an object of the present invention to provide a novel stop and release device capable of positively handling large articles of great mass, such as large rolls or coils of sheet or strip material with absolute safety.

Another object is to provide a novel stop and release device of simple design but rugged construction capable of continuously handling large articles of great mass without danger of mechanical failures.

Still another object is to provide a stop and release device of the foregoing character capable of delivering an article intermittently or a series of articles intermittently in a predetermined number less than the series.

A still further object is to provide a stop and release device employing a minimum number of moving parts for continuously delivering heavy articles intermittently or a series of heavy articles intermittently in a predetermined number less than the series with absolute control and minimum danger of mechanical failure.

A still further object is to provide a stop and release device of the character described above actuated by a single reciprocating linear force.

Other objects and features of the present invention will appear more fully from the following detailed description considered in connection with the accompanying drawings which illustrate one embodiment of the invention. It is expressly understood however that the drawings are designed for purposes of illustration only and not as a definition of the limits of the invention, reference for the latter purpose being had to the appended claims.

In the drawings, wherein similar reference characters denote similar elements throughout the several views:

FIG. 1 is a plan view illustrating a stop and release mechanism constructed in accordance with the principles of the present invention;

FIG. 3 is a sectional view along line 3—3 of FIG. 1;

FIG. 4 is a sectional view along line 4—4 of FIG. 3;

FIG. 6 is a diagrammatic view illustrating a hydraulic control system for use with the stop and release mechanism;

FIG. 7 is a sectional view along line 3—3 of FIG. 1, illustrating the stop and release mechanism in another position during its cycle of operation, and FIG. 8 is a sectional view along line 3—3 of FIG. 1, illustrating the stop and release mechanism in still another position during its cycle of operation.

Figure 2:
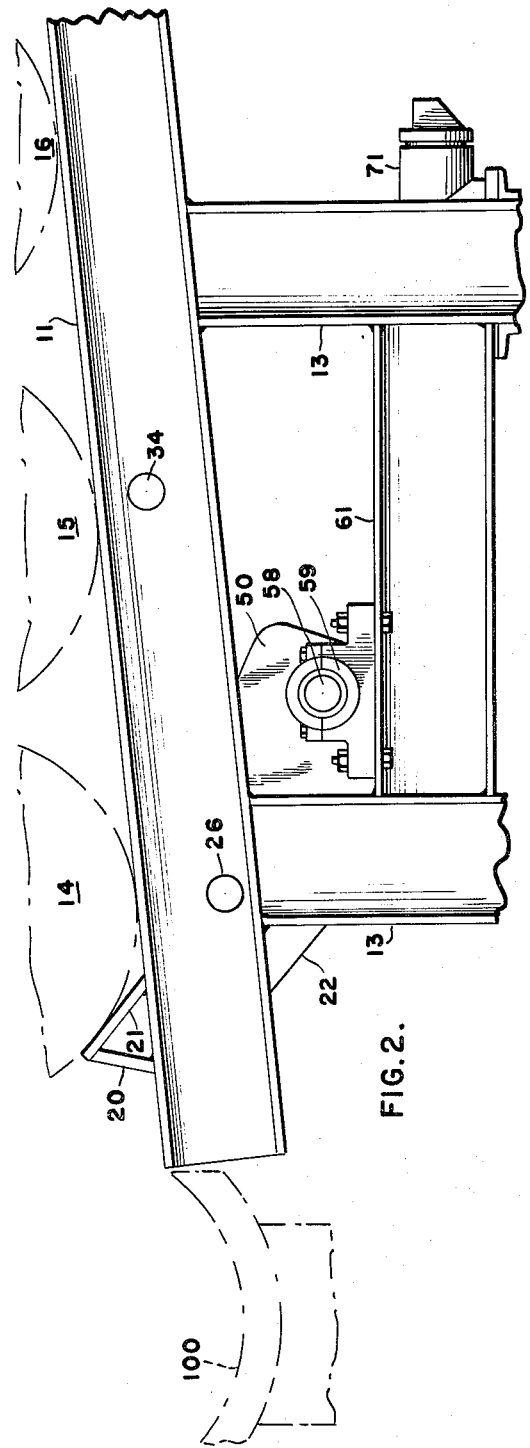
FIG. 2 is a side elevational view of the stop and release mechanism illustrated in FIG. 1.

With reference more particularly to the drawings, an apparatus embodying the principles of the present invention for delivering only a predetermined number of a series of articles is disclosed therein including an inclined platform or trackway formed from a pair of I-beams 10 and 11 spaced by transverse member 12 and supported by standards 13, 13. The I-beams 10 and 11 are properly spaced to support the articles to be delivered in transverse relation as illustrated by the position of articles 14, 15 and 16 in the drawings. The platform is inclined so that the articles are urged along a path on the platform toward its lower end, the left-hand end as viewed in the drawings. If desired differently inclined platforms including a horizontal platform may be employed together with suitable means for urging the articles in one direction along the platform. While the articles 14, 15 and 16 are shown in circular cross sectional form which may be representative of articles which roll, specifically in the illustrated embodiment sheet or strip material formed into cylindrical rolls or coils, it is to be expressly understood that the apparatus provided by the present invention may be utilized in connection with articles having other shapes and comprising different materials.

A pair of stop and release elements 17 and 18 are positioned at the lower end of the platform in spaced relation relative to the path and lengthwise of the I-beams to define an article delivery station. The spacing between the stop and release elements determines the size of the station and consequently the number of articles of a given dimension that may be delivered during a single operational cycle, while the stop and release elements 17 and 18 respectively comprise output control means and input control means for the delivery station. The stop and release element 17 includes a flat supporting plate 19 of rectangular shape positioned between the I-beams 10 and 11 extending a substantial distance along the platform. The forward end of the plate 19, that is its end nearest the lower end of the platform, is provided with a pair of angularly disposed plate members 20 and 21 which extend throughout its transverse dimension. One edge of the plates are joined to the upper surface of the plate 19 in spaced relation while their other edges are joined together to form a triangular construction projecting upwardly from the surface of the supporting plate. The stop and release element 17 is pivotally mounted with respect to the platform about a transverse axis for swinging movement from a stop position in which the supporting plate 19 is substantially parallel to, and the plate members 20 and 21 project upwardly beyond, the upper surfaces of the I-beams or the upper surface of the platform. The mounting means includes two pairs of spaced triangularly shaped parallel flanges 22, 22 and 23, 23. A corresponding side of each flange is secured to the bottom surface of the supporting plate 19, by welding or any other suitable means, so that each flange extends downwardly in perpendicular relation with respect to the bottom surface of the plate. As shown more clearly in FIG. 4, each pair of flanges is provided with an opening to receive a cylindrical bushing 24 and 25, respectively, which rotates about a transverse shaft 26 supported at its ends in the I-beams 10 and 11. The pairs of flanges 22, 22 and 23, 23 are maintained in fixed spaced relationship by means of spacing bushings 27 and 28, respectively, while transverse movement of the stop and release element relative to the platform is prevented by thrust bushings 29, 29 carried by each pair of flanges and cooperating bushings 30, 30 supported on the I-beams. For a purpose that will appear more fully below, the bushings 24 and 25 are located in the flanges slightly to the right of the center of gravity of the stop and release element as viewed in FIG. 3. With this arrangement the stop and release element 17 tends to rotate in a counterclockwise direction about the shaft 26.

Figure 5:
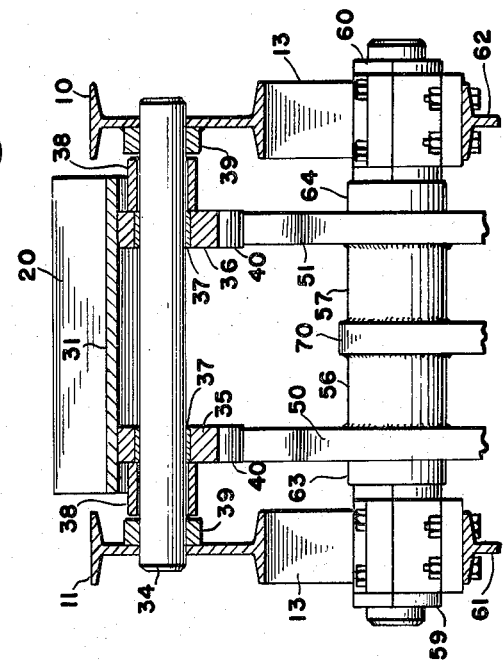
FIG. 5 is a sectional view along line 5—5 of FIG. 3.

The stop and release element 18 includes a rectangular supporting plate 31 and angularly disposed plate members 32 and 33 forming a triangular construction projecting upwardly from the forward end of the supporting plate. The stop and release element 18 is pivotally mounted about a transverse axis 34 for swinging movement relative to the platform between the I-beams 10 and 11 to a stop position in which the plate members 32 and 33 project upwardly beyond the upper surface of the I-beams or to a release position in which the surfaces 32 and 33 lie below the upper surfaces of the I-beams. As shown more clearly in FIG. 5, the stop and release element 18 includes a pair of parallel flanges 35 and 36 each provided with a bushing 37, 37 for receiving the shaft 34. Transverse positioning is obtained by thrust bushings 38 carried by the flanges and cooperating bushings 39 supported on the I-beams. The flanges 35 and 36 are secured in perpendicular relation to the bottom surface of the supporting plate 31 and project downwardly a sufficient distance to support the bushings 37, 37. The bushings 37, 37 are located near the right-hand end of the flange members, as viewed in the drawings, and a curved surface 40, 40 is provided at their other ends for a purpose that will be described more fully below.

As mentioned above, one of the objects of the present invention is to provide a novel arrangement for synchronously moving the stop and release elements 17 and 18 from or to their stop or release positions in the proper sequence so that the predetermined number of articles may enter and leave the delivery station; the arrangement including novel means continuously operable to maintain one of the stop and release elements in its stop position and for moving either of the stop and release elements to its stop position before the other stop and release element is moved to its release position, while being of simple but rugged construction capable of carrying heavy loads when delivering articles of great mass. The foregoing arrangement comprises cam means for mechanically interconnecting the stop and release elements 17 and 18 as well as for positively moving each of the stop and release elements from their stop to their release positions and vice versa. The cam means includes a pair of peripheral cams 50 and 51 mounted for rotation in the path of the flange members 35 and 36, respectively, of the stop and release element 18, and between the pairs of flange members 22, 22 and 23, 23 of the stop and release element 17, respectively. The curved surfaces 40, 40 of the flange members 35 and 36 comprise cam follower means which are adapted to contact the actuating surfaces of the cams 50 and 51. The cam follower means for the stop and release element 17 includes a roller 52 and a supporting pin 53 carried at the unsupported apex of the pair of flanges 22, 22, and a roller 54 and a pin 55 similarly associated with the other pair of flanges 23, 23; the rollers 52 and 54 being adapted for contacting the actuating surfaces of the cams 50 and 51 respectively. The cams 50 and 51 are secured to bushings 56 and 57 respectively, and the bushings are keyed to a shaft 58 rotatably mounted in bearings 59 and 60 supported on members 60 and 61 connected between the legs 13, 13. It is understood that the shaft 58 rotates about an axis parallel to the central longitudinal axis of the stop and release element supporting shafts 26 and 34. Thrust bushings 63 and 64 are provided to maintain alignment between the cams and the cam follower means of the stop and release elements.

The mechanism for rotating the cams 50 and 51 includes a crank arm 70 positioned between and secured to the bushings 56 and 57, and a fluid pressure actuated device for moving the crank arm. The fluid pressure device includes a cylinder 71 mounted in trunnions 72, 72 positioned on transverse members 73 and 74 supported by the legs 13, 13. As shown in FIG. 4, the cylinder 71 is provided with a piston 75 and a piston rod 76. The free end of the piston rod is provided with a clevis 77 for receiving the unsupported end of the crank arm 70 in pivotal relation by means of a clevis pin 78. The piston 75 is of the double acting type to positively move the cams in both directions throughout a fixed angle. It is understood that the stroke of the piston and the length of the crank arm 70 are proportioned so that the cams are rotated through the proper angle. A suitable hydraulic control means is illustrated in FIG. 6. The cylinder 71 is provided with ports 80 and 81 at its opposite ends. Conduits 82 and 83 are connected between the ports 80 and 81, respectively, and diametrically opposed ports 84 and 85 of a two position valve 86. A third port 87 of the valve communicates with a conduit 88 which discharges into a fluid reservoir 89. A fluid pump 90, driven by a motor 91, receives fluid from the reservoir through a suction conduit 92 and delivers fluid under pressure to a fourth port 93 of the valve 86 by way of a conduit 94. A pressure release valve 95 may be included in the conduit 94 with a by-pass 96 to the low pressure reservoir return conduit 88. With this arrangement, when the valve 86 is in the position shown, fluid under pressure enters the cylinder by way of the conduit 82 and port 80 and forces the piston 75 to the extreme right-hand end of the cylinder as illustrated, while the other side of the piston 75 is connected to the reservoir through port 81, conduit 83, valve port 87 and conduit 88. With the valve 86 moved to its other position, the conduit 82 is connected to the reservoir by way of the conduit 88, while high pressure fluid is introduced into the cylinder at port 81 by way of the conduit 83 to force the piston 75 to the other end of the cylinder.

The actuating surfaces of the cams 50 and 51 include a pair of spaced release position areas generally designated by reference numerals 100 and 101. The release position areas are adapted to contact the cam follower means of the stop and release elements when the cams are moved to the extremities of the angle through which they rotate. In particular, the rollers 52 and 55 contact the release portion areas 100 when the cams are rotated to their maximum position in a clockwise direction, while the curved portion 40, 40 of the stop and release element 18 contact the release position areas 101 when the cams are rotated to their maximum position in the opposite direction. The latter position is shown in FIG. 3, while the release position of the stop and release element 17 is illustrated in FIG. 8. The portion of the actuating surfaces between the spaced release position areas 100 and 101 is provided with a radius substantially greater than the radius of the release position areas, and extends throughout an arc sufficient to simultaneously contact the cam follower means of both of the stop and release elements during an intermediate position of the cams. The relationship is illustrated in FIG. 7 wherein the stop and release elements 17 and 18 are in the stop positions. Since the release position areas 100 and 101 are spaced by a stop position area 102 of the foregoing dimensions it is apparent that at least one of the stop and release elements will at all times occupy a stop position.

In FIG. 4 of the drawings the cams 50 and 51 are at their position of maximum counterclockwise rotation in which the stop and release element 17 is in its stop position and the stop and release element 18 is in its its release position. Under these conditions the series of articles are urged along the platform toward its lower end with the first article 14 of the series contacting the angularly disposed plate 21 of the stop and release element 17 to retain the series of articles on the platform. Thus the delivery station as defined by the spacing between the stop and release elements has received the predetermined number of articles of the series; in the illustrated case the predetermined number consisting of one. When it is desired to remove the article or allow the article to leave the delivery station, the valve 86 is operated to conduct fluid pressure to the right-hand side of the piston 75 and thus rotate the cams 50 and 51 in a clockwise direction. After several degrees of rotation, the release portion area 101 of the cam actuating surfaces will lose contact with the cam follower means 40 of the stop and release element 18, and the cam follower means 40 will ride upon the stop position area 102 to move the stop and release element 18 into its stop position. Due to the cam construction, the degree of rotation required to move the stop and release element 18 to its stop position is insufficient to move the stop and release element 17 to its release position. This phase in the operation of the device is illustrated in FIG. 7 of the drawings. As the piston moves to the left-hand end of the cylinder the cams will rotate throughout the remaining portion of the fixed angle to the position of maximum clockwise rotation. During this rotation the cam follower means 40 will continue in contact with the stop position area 102 of the cam actuating surfaces and maintain the stop and release element 18 in its stop position. However, as the cams approach this extremity of the fixed angle, the cam follower means 52 and 54 will enter the release position area 100 of the cam actuating surfaces and allow the stop and release element 17 to move to its release position. FIG. 8 illustrates the device in this phase of its operation. In this position the stop and release element 18 restrains motion of the series of articles, excluding the first article 14, along the path and prevents the second article 15 from entering the delivery station, while the stop and release element 17 is in a position to allow the article 14 to leave the delivery station. The article 14 will leave the delivery station at the end of the platform and may be received in a cradle 103 or any other suitable transporting device.

When it is desired to reload the delivery station the cams are rotated in the opposite direction to the other extremity of the fixed angle. At the beginning of this rotation the cam follower means 52 and 54 will leave the release position area 100 and slide upon the stop position area 102 to move the stop and release element 17 into its stop position. The cam follower means 52 and 54 will maintain this contact throughout the remaining rotation of the cams. When the cams reach this extremity of the fixed angle, the cam follower means 40 will enter the release position area 101 to move the stop and release element to its release position as shown in FIG. 4. In this position the series of articles will move downwardly along the platform until the lead article 15 contacts the plate 21 of the stop and release element 17. The apparatus is then conditioned to deliver only the predetermined number of articles in the delivery station by repeating the foregoing operational steps. It is thus apparent that throughout all phases of operation at least one of the stop and release elements is positively maintained in its stop position and that this stop and release element cannot be moved to its release position without first positively moving the other stop and release element into its stop position.

It was mentioned above that the stop and release element 17 is pivotally mounted at a point removed from its center of gravity so that the element tends to rotate in a counterclockwise direction about the shaft 26. This feature in connection with means for providing a slight counterclockwise rotation of the stop and release element 17 when the cam follower means 52 and 54 enter the release position area 100 of the cam actuating surfaces, aids in removing the article from the delivery station. In particular, when the stop and release element 17 is moved to its release position as illustrated in FIG. 8, additional counterclockwise rotation causes the rear end of the supporting plate 19 to nudge the article 14 and aid in its removal from the delivery station.

The stop and release device provided by the present invention is specifically designed to handle large articles of great mass, such as coils of sheet or strip material. For this reason a pair of spaced actuating cams are employed to carry heavy loads and balance stresses. The forward stop and release element 17 is preferably more rigidly constructed inasmuch as it functions to stop the motion of the series of articles along the platform whereas the stop and release element 18 only retains the articles in a stationary position. Thus the element 18 may be provided with two pairs of supporting flanges 22, 22 and 23, 23 and includes roller type cam follower means.

Although only one embodiment of the invention has been disclosed and described above it is expressly understood that various changes and substitutions may be made in the embodiment shown without departing from the spirit of the invention as well understood by those skilled in the art. Reference therefor will be had to the appended claims for a definition of the limits of the invention.

This is a continuation of my copending application Serial No. 271,523, filed February 14, 1952, for "Article Handling Apparatus," now abandoned.

What is claimed is:

1. Apparatus for feeding forwardly a series of articles intermittently in a number less than the series comprising a platform supporting the series of articles, means operable for urging the series forwardly along a path on the platform, first and second unitary stop and release elements, pivot means for mounting the first and second stop and release elements in spaced relation along the path for swinging movement in one direction to a stop position in which the elements project into the path of the forward movement of the articles and for swinging movement in the opposite direction to a release position in which the elements are retracted from the path, the first stop and release element being positioned ahead of the second stop and release element with respect to the direction of movement of articles along the path, a cam having an actuating surface, the first stop and release element including a cam contacting surface displaced from the pivot means of the first stop and release element, the second stop and release element including an extension depending downwardly with respect to the path and the extension including a cam contacting surface located below the axis of the pivot means of the second stop and release element, means for rotatably mounting the cam on an axis parallel to and displaced below the axes of the pivot means of the first and second stop and release elements and located between vertical planes passing through the axes of the pivot means of the first and second stop and release elements, means for rotating the cam through a fixed angle, the actuating surface of the cam including a release position area for each of the stop and release elements and a stop position area for each of the stop and release elements with the stop position areas being located between the release position areas, the stop position areas being radially spaced from the axis of the cam a distance equal to the radial distance between the axis of the cam and the cam contacting surfaces when the stop and release elements are in stop position and the release position areas being radially spaced from the axis of the cam by a distance equal to the radial distance between the axis of the cam and the cam contacting surfaces when the stop and release elements are in the release position, and the release position areas being spaced from each other by a distance greater than the maximum arcuate space between the cam contacting surfaces measured along a curved line equally distant from the axis of the cam and passing through the cam contacting surfaces, the cam being relatively positioned with respect to the fixed angle so that the cam contacting surface of one of the stop and release elements engages one of the stop position areas at one extremity of the fixed angle and so that the cam contacting surface of the other stop and release element engages the other stop position area at the other extremity of the fixed angle.

2. Apparatus as defined in claim 1 in which the pivot means of the stop and release elements are displaced from the center of gravity of respective stop and release elements in a direction opposite the direction of movement of the articles along the path.

3. Apparatus as defined in claim 1 in which the cam contacting surface of the second stop and release element is positioned relative to the cam so that a force tending to move the second stop and release element to its release position is transmitted through the cam radially to the axis of the cam.

References Cited in the file of this patent

UNITED STATES PATENTS 2,071,356     Pagett ------------------ Feb. 23, 1937

FOREIGN PATENTS 14,084     Great Britain ------------ Apr. 22, 1852